June 24, 1924.
S. H. SMITH
1,499,258
BRAKING MECHANISM
Filed Feb. 6, 1922
2 Sheets-Sheet 1
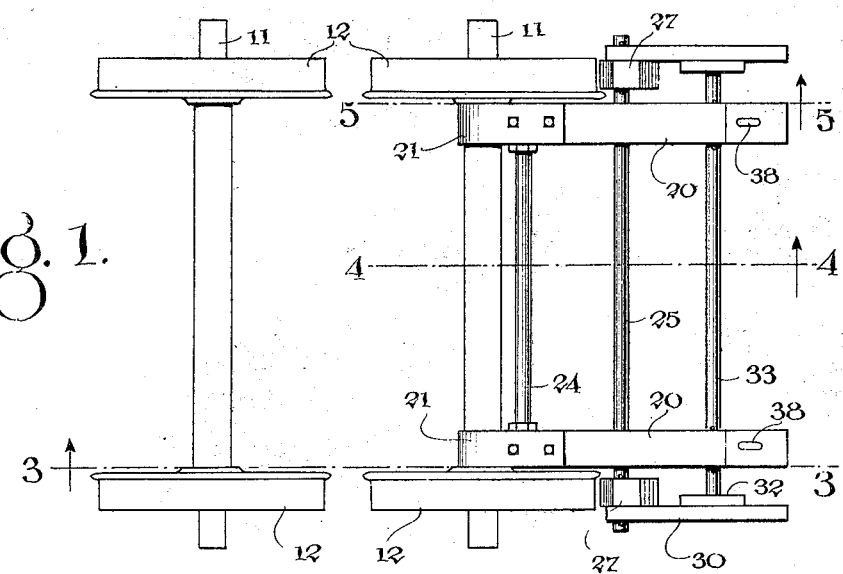
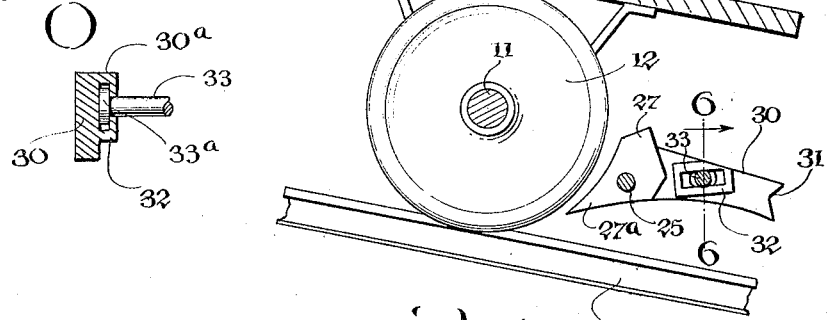
WITNESSES
INVENTOR
SIDNEY HENRY SMITH.
BY
ATTORNEYS

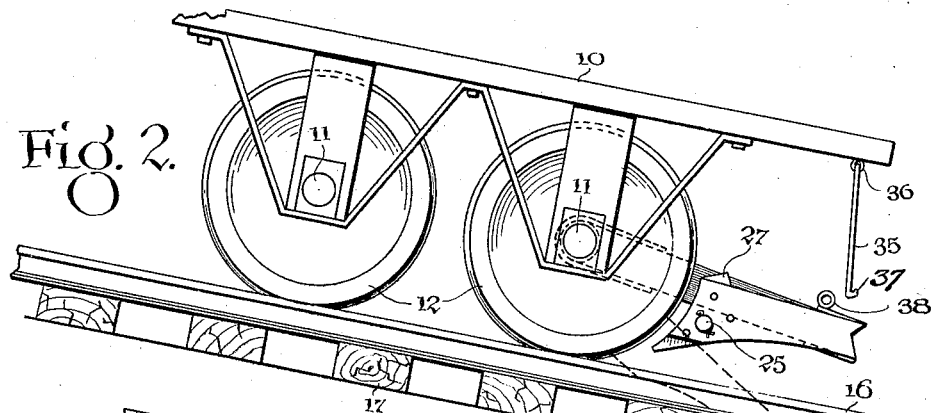
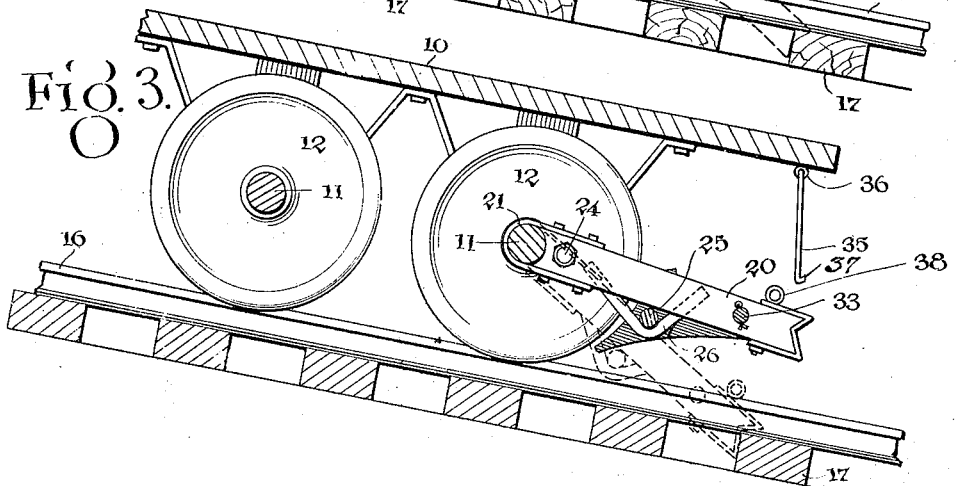
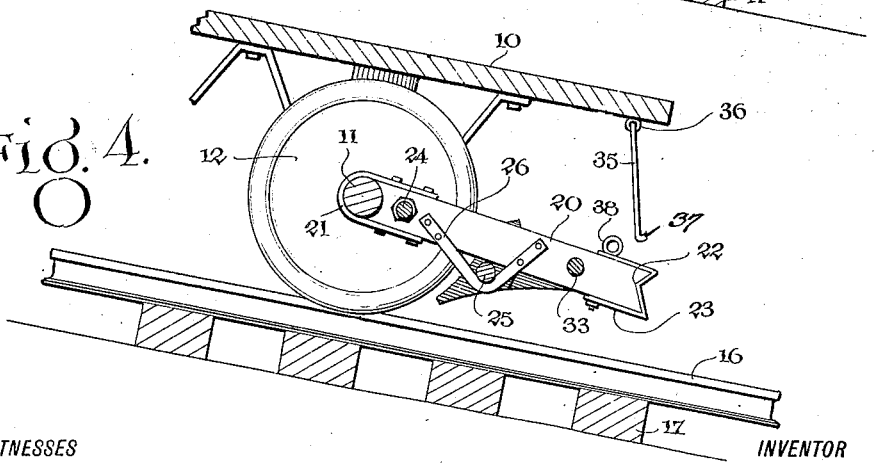

Patented June 24, 1924.

1,499,258

UNITED STATES PATENT OFFICE.

SIDNEY HENRY SMITH, OF BROOKHAVEN, MISSISSIPPI.

BRAKING MECHANISM.

Application filed February 6, 1922. Serial No. 534,546.

*To whom it may concern:*

Be it known that I, SIDNEY H. SMITH, a citizen of the United States, and a resident of Brookhaven, in the county of Lincoln and State of Mississippi, have invented certain new and useful Improvements in Braking Mechanisms, of which the following is a specification.

This invention relates to an improvement in braking mechanisms and is especially adapted for use with log skidders on steep grades.

An object of the invention is to provide a braking mechanism of this character which prevents retrograde or running back movement of the log skidder or truck with which it is associated, the braking mechanism coming into operation automatically upon breaking of the uphaul cable or chain thereby preventing accidents and destruction of life and property.

Another object is to provide a device of this character wherein means is provided for engaging the ties of the road bed and wherein such means is organized and coacts with means for engaging both the wheels and rail whereby retrograde movement of the car or truck is effectively prevented without subjecting any of the elements of the car or truck to undue strain, the strain of stopping the car being distributed and the braking mechanism being of such a character as to come immediately into play and preclude the possibility of the car acquiring momentum.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a plan view, illustrating the invention embodied in a log skidder, the body and other parts being omitted for the sake of illustration;

Figure 2 is a view thereof in side elevation;

Figure 3 is a view in longitudinal vertical section on line 3—3 of Figure 1;

Figure 4 is a similar view on line 4—4 of Figure 1;

Figure 5 is a similar view on line 5—5 of Figure 1; and

Figure 6 is a detail view in section, on line 6—6 of Figure 5.

Referring to the drawings wherein for the sake of illustration is shown the preferred embodiment of the invention, the numeral 10 designates generally a truck or car of the type used as a log skidder. The truck includes axles 11 and wheels 12. Such cars usually operate on a steep grade or incline. The rails of the incline are designated at 16 and are supported in the usual manner upon ties 17.

The braking mechanism which constitutes the present invention comprises a plurality, preferably a pair, of tie engaging dogs 20 pivotally mounted upon an axle 11 by means of straps 21 which are secured to the dogs and which embrace the axle. The free ends of the tie engaging dogs are notched or shaped, as at 22, and these notched or shaped ends are reinforced by heads or caps 23 of corresponding shape. The notch or shaped ends of the dogs facilitate the engagement with the tie, as shown to advantage in Figures 2 and 3. A transverse bar 24 extends between and is secured to the dogs 20 and reinforces and braces the dogs and constrains them to partake of corresponding motion.

A shaft 25 is loosely supported on the dogs 20 by means of brackets 26, the shaft extending parallel to the bars 24 and being slightly spaced therefrom and the ends of the shaft projecting beyond the dogs and extending across the peripheries of the wheels, though slightly spaced therefrom. Chocks 27 are arranged on the shaft 25, as shown in Figure 1, and these chocks have their forward portions or heads tapered or formed as indicated at 27ª so as to be adapted to operate in the space between the wheels and the rails and to engage both the wheels or rails in the braking or operating position of the chocks.

Chock positioners comprising arms 30 are provided and each arm 30 is secured to its chock 27 and is mounted on the shaft 25 and has its free end notched or otherwise formed, as at 31, to engage the tie. Adjacent its tie engaging end each chock positioner 30 has a sliding connection indicated generally at 32 with one end of a rod 33 which is supported upon the dogs 20 and extends transversely thereof, the ends of the rod projecting beyond the dogs, as shown in Figure 1. Each sliding connection 32 preferably comprises a squared head 33ª formed upon the end of the rod 33 and guideways 30ª formed on the chock positioning arm 30 and slidably receiving the squared head of the shaft.

Means is provided for maintaining the braking mechanism inoperative when desired, and this means preferably comprises swinging arms 35 pivotally connected to the under side of the body of the truck 10, as indicated at 36, and having hooked ends 37 engageable with eyes 38 secured to the free ends of the dogs 20. In order to engage the eyes with the hooked ends 37 it is necessary to elevate the dogs 20 and to manually position the hooked ends within the eyes 38. Again when it is desired to render the braking mechanism operative it is necessary to manually disengage the hooks 37 from the eye 38.

When the hooked ends 37 are disengaged from the eyes 38 the braking mechanism is operative and at such time should the up-haul chain break and the car start back down grade the dogs 20 would automatically come into engagement with the ties, as shown in dotted lines in Figure 3, and at the same time the arms 30 would come into engagement with the ties and these arms would move the chocks into gripping engagement with the wheels and rails, the sliding connection 32 permitting the arms to partake of the necessary movement to carry out this action. The combined action of the dogs and chocks would immediately arrest the movement of the car and would do so before it had acquired any great degree of momentum. The engagement of the dogs 20 with the ties is positive and not liable to break down, this being due to the formation of the end of the dog and of the cap which is associated therewith. The chocks are positively urged into gripping engagement with the wheels and rails by virtue of the action of the chock positioners 30. It is to be noted that the chocks have perfect freedom to accommodate themselves to any movements which may be necessary since the shaft 25 which carries them is loosely supported and since the sliding connection between the arms 30 and dogs admits of all of the necessary movement of these arms. The dogs may be permitted to drag across the ties during the up-grade movement of the car so that in the event that the car or vehicle tends to move down grade they will immediately come into action and prevent retrograde movement of the car in the manner described.

I claim:

1. In a device of the character described, a pair of pivoted dogs, chocks loosely mounted on said dogs and chock positioners rigidly connected with the chocks and having sliding connection with the dogs.

2. In combination with a railway vehicle including an axle and wheels, a pair of tie engaging dogs pivotally mounted upon the axle, a pair of chocks loosely mounted on the tie engaging dogs and a pair of arms connected with the chocks and adapted for engagement with the ties for automatically positioning the chocks on retrograde movement of the vehicle.

3. In a device of the character described, a pair of tie-engaging dogs, a shaft, brackets secured to the dogs and loosely supporting said shaft, chocks arranged on said shaft, chock positioners comprising arms arranged on said shaft and rigidly connected to said chocks, a transverse rod extending between and through said dogs and sliding connections between the ends of said shaft and said arms.

4. In a device of the character described, a pair of tie engaging dogs, a shaft loosely supported upon said dogs, chocks carried by said shaft and chock positioners cooperable with the chocks.

5. In a device of the character described, a pair of tie engaging dogs, chocks loosely supported upon said dogs and chock positioners cooperable with said chocks and adapted to be engaged by the ties.

6. In combination with a railway vehicle including an axle and wheels, a pair of tie engaging dogs, means for pivotally mounting said dogs on said axle, a transverse rod extending between and secured to said dogs, a shaft, brackets secured to said dogs and loosely mounting said shaft, chocks arranged on said shaft, chock positioners comprising arms arranged on said shaft and rigidly secured to said chocks, the ends of said arms being adapted for engagement with the ties, a transverse rod extending between and through and secured to said dogs and sliding connections between the ends of said rod and said arms.

7. In combination with a railway vehicle including a body, an axle and wheels, a pair of tie engaging dogs, chocks loosely supported upon said dogs, chock positioners rigidly connected to said chocks and having sliding connection with said dogs and means for releasably supporting said dogs and chocks in elevated inoperative position including arms pivotally supported upon the body of the vehicle and having hooked ends and eyes carried by the dogs and engageable with the hooked ends of the arms.

8. In combination with a railway vehicle, tie engaging dogs mounted on said vehicle, chocks carried by said dogs, and chock positioners cooperable with the chocks.

9. In combination with a railway vehicle, a tie engaging dog pivotally mounted thereon, and a chock carried by said dog and arranged to come into operation when the dog is active to prevent retrograde movement of the vehicle.

SIDNEY HENRY SMITH.